June 25, 1935.  F. L. SCHLEICHER  2,005,833

FLUID SEAL

Filed July 4, 1933

INVENTOR.
F. L. Schleicher.
BY
ATTORNEY.

Patented June 25, 1935

2,005,833

UNITED STATES PATENT OFFICE 2,005,833

FLUID SEAL

Frederick L. Schleicher, St. Louis County, Mo.

Application July 4, 1933, Serial No. 679,007

16 Claims. (Cl. 286—7)

This invention relates to fluid seals.

The object of my invention is to provide a seal which surrounds a shaft, and which is disposed between a stationary socket abutment and a socket abutment rotatable with the shaft.

A further object of the invention resides in a fluid seal for pumps, compressors, and the like, embodying three cooperating members, one of which is stationary, another revoluble and concentrically disposed with relation to the stationary member and in axial alignment therewith, and, the other which is an intermediate member that has its axis disposed at an angle to the axis of stationary and revoluble members so as to set up a rotary oscillation thereof to cause a continuous lapping effect upon the joint surfaces between the intermediate member and the stationary and revoluble members, whereby to provide two spaced leak proof joints.

A further object of the invention resides in providing an intermediate sealing member which is substantially spherical except for opposed sides thereof, which are flat due to a central bore therethrough.

A further object of the invention resides in providing a stationary member and a revoluble member each with a seat conforming in contour or shape to the contour of the outer wall of an intermediate member which embracingly engages the seats of both the stationary and revoluble members, which are concentrically disposed.

A further object of the invention resides in providing cooperating seal members having a single ball and double socket arrangement, one of the sockets being stationary, the other revoluble, and the ball member being both rotatable and oscillating between the socket members, the ball members having a bore of larger diameter than the shaft it surrounds, the shaft having members thereon to engage the wall of the ball bore adjacent opposite ends thereof to support the ball member in such a position that the axis thereof is always disposed at an angle to the axis of the socket members and the shaft.

A still further object of the invention is the provision of cooperating seal members having a single ball and double socket arrangement and the ball member being fluctuant between the socket members to set up a continuous lapping in effect between the ball and socket members.

A still further object of the invention is the provision of a fluid seal which possesses advantages in points of simplicity and efficiency, and, at the same time proves itself comparatively inexpensive in cost of manufacture.

The above and such other objects of the invention as may hereinafter appear, will best be understood from the description of the accompanying drawing which illustrates one embodiment of the invention, and in which.

Figure 1:
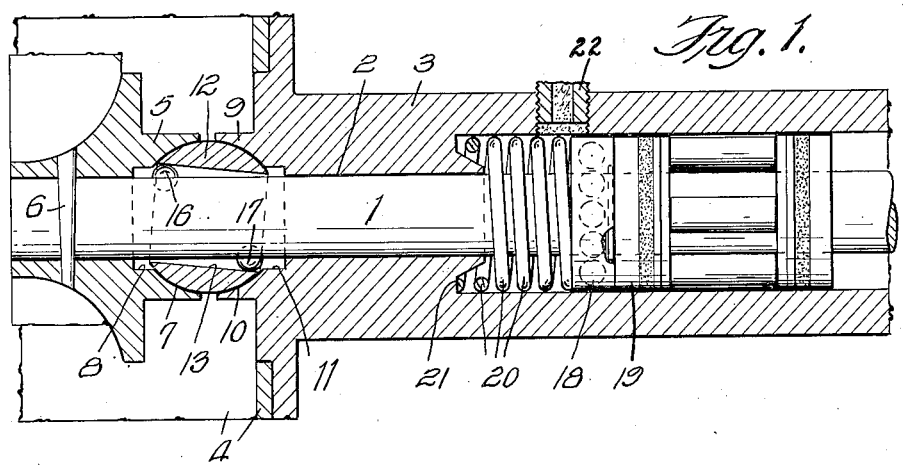
Fig. 1 is an elevational view of a fluid seal with parts broken away and in section embodying the features of my invention.

Referring to the drawing, the reference numeral 1 designates a shaft which extends through an opening 2 formed in a bearing member 3 to be sealed against fluid leakage along the shaft from within a casing, or housing 4 to which the bearing member is secured, or formed, as an integral part thereof, as may be desired.

The shaft 1 passes through the opening 2 of the bearing member and projects inwardly therefrom into the casing, or housing 4.

A socket shaped seal member 5 is secured to the shaft 1 by any suitable means, such for instance, as a key or pin 6 receivable in registered openings in the seal member and the shaft, so as to be revoluble together and which will be known hereinafter as the revoluble socket seal member. The revoluble socket seal member 5 is provided on one side with a recess having a spherical surface 7 which terminates at one end in a circular recess 8 to form an annular recess around the shaft 1. The revoluble seal member 5 within the bounds of the spherical surface 7 serves as a revoluble socket, as will be more clearly apparent hereinafter.

A stationary socket seal shaped member 9 is formed as a part of the bearing 3 extending inwardly from the housing 4. The stationary seal member 9 is provided on one side with a recess having a spherical surface 10 which terminates at one end in a circular recess 11 to form an annular recess around the shaft 1. The stationary seal member within the bounds of the spherical surface serves as a stationary wall socket, as will be more clearly apparent hereinafter. The revoluble socket member 5 and the stationary socket member 9 are both arranged in concentric relation with the shaft 1 and the annular recesses around the shaft. The socket or seal members are spaced in suitable opposed relation as clearly shown in Figs. 1 and 2.

A third member is employed, which I term a rotary fluctuating seal member and it is designated 12, and is provided with a bore 13 of greater diameter than the diameter of the shaft 1. The seal member 12 is mounted to surround the shaft 1 between, or intermediate the revoluble and stationary seal members 5 and 9 and the outer spherical surface thereof embracingly engages the spherical surfaces 7 and 10 of the revoluble and stationary seal members 5 and 9, respectively.

The shaft 1 is provided on opposite sides thereof in diagonal relation to the center of the spherical seal member 12, with recesses designated 14 and 15 to serve as seats for suitable protruding members, such for instance, as balls 16 and 17, respectively, which are only partly seated in the recesses so as to protrude beyond the surface of the shaft 1. The balls 16 and 17 are adapted to engage the wall of the bore 13 of the fluctuating or rotary oscillating seal member 12 near the ends thereof, and in so doing, causes the axis of the seal member 12 to assume an angle to the axis of the shaft 1, as is clearly apparent from Figs. 1 and 2.

The shaft 1 within the bearing 3 is provided with a suitable anti-friction thrust member 18, such for instance as a caged ball bearing, which is held against outward movement on the shaft by suitable means, such as a stop, or shoulder 19. A suitable coiled expansion spring 20 is disposed around the shaft 1 with one end thereof engaging a stationary abutment 21 and the opposite end thereof engaging the thrust member 18 which surrounds the shaft, as is clearly apparent from Fig. 1 to hold the revoluble seal member 5 in surface contact with one side of the rotatable oscillating seal member 12 and the other side of the seal member 12 in surface contact with the stationary seal member 9.

The bearing 3 is packed with suitable lubricant, such for instance, as grease around the spring 20 and the grease is fed into the bearing from a suitable fitting 22.

In operation, the shaft 1 is suitably rotated and the socket seal member 5 revolves concentrically therewith. The protuberances 16 and 17 also rotating with the shaft 1, cause the intermediate spherical seal member 12 to oscillate longitudinally of and around the shaft, thereby setting up an efficient lapping action against the surfaces of the revoluble and stationary socket seal members to provide two spaced leak proof joints forming an efficient seal around the shaft 1 to prevent fluid leakage from within the housing 4 along the shaft 1 and bearing 3. The intermediate spherical seal member 12 not only oscillates longitudinally of the shaft 1 during rotation of the shaft 1, but it also rotates in the direction of rotation of the shaft 1, thus not only providing an efficient seal, but also affording efficient lubrication of the surfaces of the joints between the three seal members 5, 9 and 12. The speed of rotation of the intermediate seal member 12, is, of course, much less than that of the shaft 1 for the reason that the impelling force therefor is only that of the protuberances on the shaft 1. If desired, the space between the intermediate seal member 12 and the shaft may be packed with grease when the parts are assembled.

There is suitable clearance between the balls 16 and 17 and the wall of the bore 13 of seal member 12.

Figure 2:
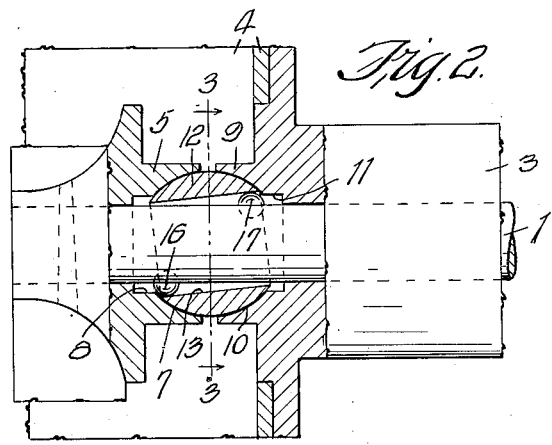
Fig. 2 is a view similar to Fig. 1, showing the shaft in reversed position to that shown in Fig. 1.
Figure 3:
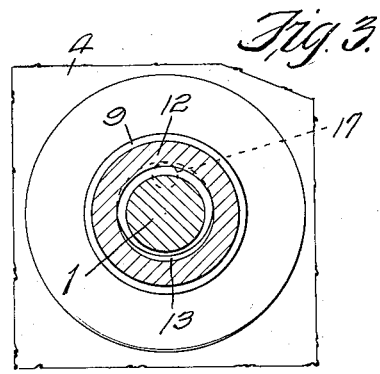
Fig. 3 is a sectional view taken on a center line through the fluctuating member of the seal looking toward the stationary member thereof, as indicated by section line 3—3 of Fig. 2.
Figure 4:
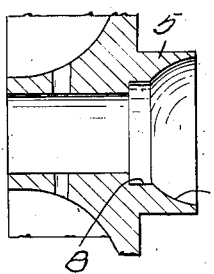
Fig. 4 is a sectional view of the revoluble member of the fluid seal, which is secured to a shaft.
Figure 5:
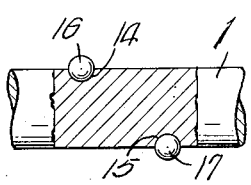
Fig. 5 is an elevational view of part of the shaft with parts thereof broken away and in section illustrating the location of balls seated in shaft recesses and acting as protuberances to impart fluctuations, or reciprocating movements to the fluctuating member of the seal as the shaft rotates.
Figure 6:
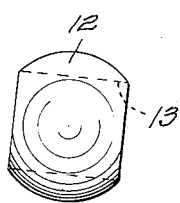
Fig. 6 is a side elevation of the fluctuating member of the seal.
Figure 7:
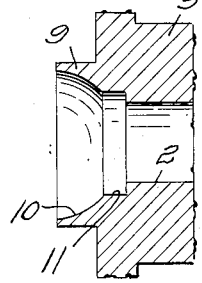
Fig. 7 is a sectional view of stationary member of the seal.

It will be apparent from Figs. 1 and 2 of the drawing that the center of the ball shaped sealing member 12 always remains with the axis of the shaft 1, thus there is set up between the two concentrically arranged socket members 5 and 9, an efficient lapping in of the three seal member surfaces by the oscillations and rotations of the seal member 12, whiih never changes its center relative to the axis of the two socket members 5 and 9 of the shaft 1.

Figure 8:
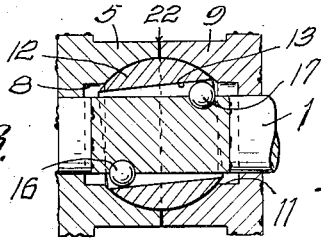
Fig. 8 illustrates a modification showing the adjacent faces of the socket seal member in riding contact to envelop the intermediate spherical seal member.

As shown in the modification in Fig. 8, adjacent surfaces of the socket members are in substantial contact, thus sealing the intermediate seal member 12 from outside elements, carried in fluid, or liquid that may surround the socket members, thus no part of the surface of the member 12 is exposed to the action of foreign or outside elements.

The constant changing of the spherical sealing member 12 with respect to the revoluble and stationary concentrically arranged socket sealing members 5 and 9 eliminates undue wearing of sealing member surfaces and the oscillating and rotary action of the intermediate sealing member 12 affords efficient lubrication of the several cooperating sealing surfaces. A fluid seal for rotary shafts embodying the features of my invention, insures highly efficient sealing contact between the sealing member surfaces to prevent fluid leakage around the shaft due to the efficient lapping action set up between the sealing member surfaces.

The many advantages of the herein described invention will readily suggest themselves to those skilled in the art to which it appertains.

From the foregoing description, it is apparent that a simple device for this purpose has been disclosed, but it is to be understood that I do not desire to restrict, or limit myself to the very details of the construction shown and described, which is merely illustrative, it being obvious that various changes, not involving the exercise of invention, may be made without conflicting or departing from the spirit of the invention within the scope of the appended claims.

What I claim is:

1. In a fluid seal construction for rotary shafts, a socket member concentric with and revoluble with the shaft and disposed within a housing, a bearing for the shaft, a stationary socket member on the inner end of the bearing and concentric therewith, an intermediate seal member having a spherical surface surrounding the shaft and embracingly engaged by the socket members, said intermediate seal member provided with a bore of greater diameter than the shaft and means on the shaft for constantly changing the axis of the intermediate seal member with relation to the shaft and slowly rotating the same to effect an efficient lapping action to the sealing member surfaces.

2. In a fluid seal construction for rotary shafts, a socket member concentric with and revoluble with the shaft and disposed within a housing, a bearing for the shaft, a stationary socket member on the inner end of the bearing and concentric therewith, an intermediate seal member having a spherical surface surrounding the shaft and embracingly engaged by the socket members, said intermediate seal member provided with a bore of greater diameter than the shaft and means on the shaft for constantly changing the axis of the intermediate seal member with relation to the shaft and slowly rotating the same to effect an efficient lapping action to the sealing member surfaces, and a resilient member for holding the sealing members in surface contact.

3. A fluid seal comprising a stationary socket member, a revoluble socket member, said members being truly disposed in spaced relation and in true axial alignment, an oscillating ball shaped member interposed between said socket members and embracingly engaged thereby, a shaft surrounded by said members and means on the shaft adapted to engage the wall of a bore through the oscillating member to maintain the axis of the oscillating member at an angle to the axis of the socket members and the shaft at all times.

4. In a bearing and fluid seal construction for a rotary shaft wherein two continuously lapped joints are desirable, bearing and sealing means including a member secured to a shaft to revolve therewith and having on one side a spherical surface, a ball shaped member which is lapped to and with the revoluble spherical surface and having a bore therethrough larger than the diameter of the shaft which passes therethrough, surface protuberances on the shaft to position the ball shaped member around the shaft with the axis thereof disposed at an angle to the axis of the shaft to set up a rotary and oscillating lapping movement thereto and a third member having a spherical surface with which the ball shaped member has lapping surface contact, and resilient means on the shaft causing thrust engagement of the first mentioned spherical surface with the ball shaped member and thrust engagement of the second member with the third member.

5. A fluid seal comprising a shaft, a socket member fixed on said shaft concentric therewith so as to revolve therewith, a stationary socket member concentric with the shaft and having an opening through which the shaft passes outwardly, a ball shaped member surrounding the shaft between the revoluble and stationary socket members and spaced means on the shaft whereby rotation of the shaft will set up rotation and oscillations to the ball shaped member without changing the center thereof for continuous lapping action of the ball shaped member with the socket member revoluble with the shaft and with the stationary socket member and means designed to hold the three members in bearing and sealing contact.

6. A fluid seal for shafts having in combination with a casing and a bearing for the shaft to pass through, a socket member on the shaft within the casing and revoluble with the shaft, a stationary socket member on the inner end of the bearing, a ball member having a bore therethrough for the passage of the shaft, said ball being disposed between the socket members and in surface contact therewith and spaced means on the shaft within and disposed adjacent opposite ends of the bore of the ball member for constantly changing the position of the axis of the ball member relative to the axis of the shaft during rotation of the shaft to set up a rotary oscillating movement to the ball member to lap the joints between the ball and the socket members.

7. A fluid seal for shafts having in combination with a casing and a bearing for the shaft to pass through, a socket member on the shaft within the casing and revoluble with the shaft, a stationary socket member on the inner end of the bearing, a ball member having a bore therethrough for the passage of the shaft, said ball being disposed between the socket members and in surface contact therewith and spaced means on the shaft within and disposed adjacent opposite ends of the bore of the ball member for constantly changing the position of the axis of the ball member relative to the axis of the shaft during rotation of the shaft to set up a rotary oscillating movement to the ball member to lap the joints between the ball and the socket members, and means disposed between an abutment on the shaft and the bearing to hold the surfaces of the sockets in leak proof contact with the surface of the ball member.

8. In combination with a bearing supported rotary shaft extending out of a housing, a seal member revoluble with the shaft, a stationary seal member in concentric relation with the revoluble seal member, an intermediate ball shaped seal member having an opening for the shaft and larger in diameter than the shaft and the ball shaped member being in surface contact with the other two seal members and means on the shaft for imparting oscillating and rotary motion to the intermediate seal member.

9. In combination with a bearing supported rotary shaft extending out of a housing, a seal member revoluble with the shaft, a stationary seal member in concentric relation with the revoluble seal member, an intermediate ball shaped seal member having a shaft passage for the shaft and larger in diameter than the shaft, said ball member being in surface contact with the other two seal members, a pair of balls on the shaft and arranged in diagonal relation within the shaft passage of the intermediate ball shaped seal member for setting up oscillating action to the ball shaped member longitudinally of the shaft, and rotary motion in the direction of rotation of the shaft to set up an efficient lapping action between the seal member surfaces.

10. A fluid seal comprising a shaft, a stationary socket member having an opening for the shaft, a socket member secured to the shaft to revolve therewith, a ball shaped seal member having a bore larger in diameter than the shaft and through which the shaft passes, members on the shaft for imparting oscillating motion to the ball shaped seal member between and in facial contact with the socket members without changing the center of the ball shaped seal member with relation to the axis of the socket members and the shaft.

11. In a bearing and fluid seal construction for a rotary shaft wherein two continuously lapped joints are desirable, bearing and sealing means including a member secured to a shaft to revolve therewith and having on one side a spherical surface terminating in a recess to provide an annular channel around the shaft, a ball shaped member which is lapped to and with the revoluble spherical surface and having a bore therethrough larger than the diameter of the shaft which passes therethrough, surface protuberances on the shaft to position the ball shaped member around the shaft with the axis thereof always disposed at an angle to the axis of the shaft to set up an oscillating and rotary lapping movement thereto, a third member having on one side a spherical surface terminating in a recess to provide an annular channel around the shaft and with which spherical surface the ball shaped member has oscillating and rotary lapping contact, resilient means on the shaft and abutments between which the resilient means acts to effect efficient surface contact of the second member with said first and third members.

12. A fluid seal comprising a stationary socket member, a revoluble socket member, said members being truly disposed in spaced relation and true axial alignment, a ball shaped member having a bore interposed between said socket members and embracingly engaged thereby, a shaft passing through the bore of the ball shaped member and means on the shaft for imparting oscillating movement to the ball relative to the socket members during rotation of the shaft.

13. A fluid seal comprising a revoluble shaft, a socket member secured concentrically on the shaft and revoluble therewith, a stationary wall socket member arranged in spaced concentric relation with the revoluble socket member and having an opening through which the shaft passes outwardly, a ball shaped member disposed around the shaft and embracingly engaged by the two socket members, and means disposed between the ball shaped member and the shaft for imparting rotary and oscillating movement to the ball shaped member.

14. In a bearing and fluid seal construction for a rotating shaft wherein a continuously lapped joint is desirable, bearing and sealing means including a member revoluble with the shaft and having on one side a spherical surface concentric with the shaft, a second bearing having on one side a spherical surface that is stationary, a rotatable ball shaped member embracingly engaged by the revoluble and stationary members and means carried by the shaft to cause the ball shaped member to oscillate during rotation of the shaft.

15. In a fluid seal, a rotary shaft, means having a spherical surface secured to the shaft to revolve therewith, stationary means having an opening therein for the shaft to pass outwardly and said stationary means having a spherical surface surrounding the shaft, said spherical surfaces being in spaced axial alignment and concentric with the shaft, a ball shaped member loosely surrounding the shaft and embracingly engaged by the revoluble and stationary spherical surfaces, means interposed between the shaft and the ball shaped member to rotate and oscillate the ball shaped member during rotation of the shaft to provide two continuously lapped-in joints on opposite sides of the ball shaped member, and means for yieldably holding the joint surfaces in bearing and sealing contact.

16. In a fluid seal for a rotating shaft where lapped joints are desirable, revoluble means on the shaft having a spherical surface, stationary means having a spherical surface through which the shaft passes outwardly, said surfaces being concentric with the shaft and disposed in spaced relation, ball shaped means disposed between the spherical surfaces of the revoluble means and the stationary means and surrounding the shaft, means on the shaft for rotating and oscillating the ball shaped member during rotation of the shaft, and resilient means on the shaft for setting up an end thrust against the stationary means to hold all of said means in bearing and sealing contact.

FREDERICK L. SCHLEICHER.